US010911073B2

(12) United States Patent
Schmidhammer et al.

(10) Patent No.: US 10,911,073 B2
(45) Date of Patent: Feb. 2, 2021

(54) MULTIPLEXER

(71) Applicant: SNAPTRACK, INC., San Diego, CA (US)

(72) Inventors: Edgar Schmidhammer, Munich (DE); Thomas Metzger, Munich (DE); Juha Ellä, Hallkko (FI); Arto Holm, Oulu (FI)

(73) Assignee: SnapTrack, Inc., San Diego, CA (US)

( * ) Notice: Subject to any disclaimer, the term of this patent is extended or adjusted under 35 U.S.C. 154(b) by 0 days.

(21) Appl. No.: 16/323,699

(22) PCT Filed: Jul. 11, 2017

(86) PCT No.: PCT/US2017/041552
§ 371 (c)(1),
(2) Date: Feb. 6, 2019

(87) PCT Pub. No.: WO2018/031163
PCT Pub. Date: Feb. 15, 2018

(65) Prior Publication Data
US 2019/0181890 A1    Jun. 13, 2019

(30) Foreign Application Priority Data
Aug. 8, 2016    (DE) .................. 10 2016 114 663

(51) Int. Cl.
*H04B 1/00*    (2006.01)
(52) U.S. Cl.
CPC ........... *H04B 1/0057* (2013.01); *H04B 1/006* (2013.01)

(58) Field of Classification Search
CPC .... H04B 1/0057; H04B 1/006; H04B 1/0067; H04B 1/0071; H04B 1/0075
See application file for complete search history.

(56) References Cited

U.S. PATENT DOCUMENTS

| 9,252,832 B2 * | 2/2016 | Matsuo ............... H04B 1/18 |
| 2002/0090974 A1 | 7/2002 | Hagn et al. |
| 2008/0070511 A1 | 3/2008 | Fujiwara et al. |
| 2009/0093270 A1 | 4/2009 | Block et al. |
| 2013/0201882 A1 * | 8/2013 | Bauder ............... H03H 7/48 370/277 |

(Continued)

FOREIGN PATENT DOCUMENTS

| CN | 104081706 A | 10/2014 |
| CN | 104919713 A | 9/2015 |

(Continued)

OTHER PUBLICATIONS

International Search Report and Written Opinion—PCT/US2017/041552—ISA/EPO—dated Oct. 13, 2017.

*Primary Examiner* — Candal Elpenord
(74) *Attorney, Agent, or Firm* — Gerald P. Joyce, III

(57) ABSTRACT

A reconfigurable multiplexer including a plurality of filter and/or duplexers, each respectively associated with a frequency band and can be connected to an antenna connector via a band switch individually or several at the same time. One or more phase shifters capable of adjusting a phasing of a filter or duplexer during a multiplex mode so as to improve the interband insulation in a given multiplex mode. A variable notch can be connected to one of the filters or partial filters of a duplexer.

10 Claims, 11 Drawing Sheets

(56) References Cited

U.S. PATENT DOCUMENTS

| | | | | |
|---|---|---|---|---|
| 2014/0307599 | A1* | 10/2014 | Rousu | H04L 5/1461 |
| | | | | 370/297 |
| 2015/0133067 | A1 | 5/2015 | Chang et al. | |
| 2015/0257007 | A1* | 9/2015 | Solondz | H04W 12/08 |
| | | | | 713/154 |
| 2015/0349821 | A1 | 12/2015 | Rai et al. | |
| 2015/0365946 | A1* | 12/2015 | Luong | H04L 1/0003 |
| | | | | 370/329 |
| 2016/0099800 | A1* | 4/2016 | Park | H04B 1/0057 |
| | | | | 370/275 |
| 2017/0063412 | A1* | 3/2017 | Ripley | H04B 1/18 |
| 2017/0294947 | A1* | 10/2017 | Little | H04B 7/0825 |
| 2019/0190491 | A1* | 6/2019 | Nosaka | H03H 9/6483 |
| 2019/0379352 | A1 | 12/2019 | Nosaka | |

FOREIGN PATENT DOCUMENTS

| | | |
|---|---|---|
| CN | 105684367 A | 6/2016 |
| WO | 2015135588 A1 | 9/2015 |

* cited by examiner

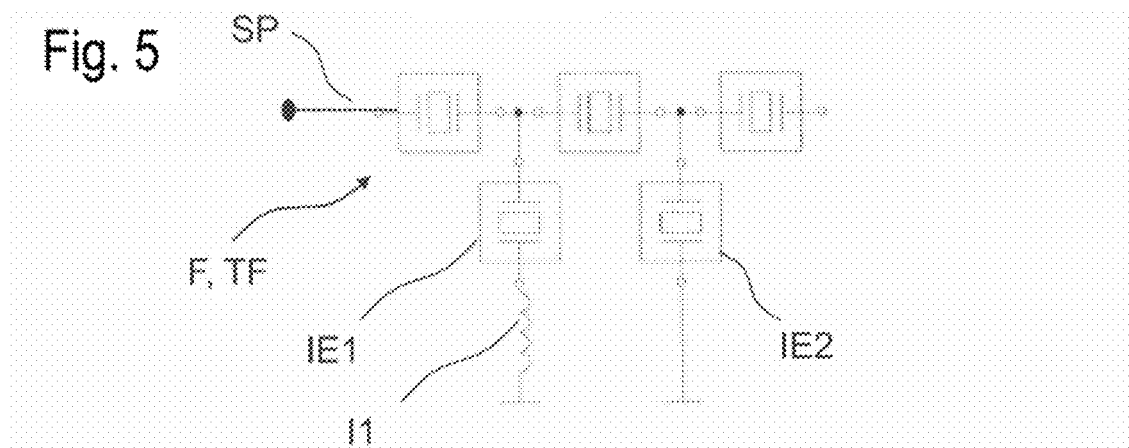
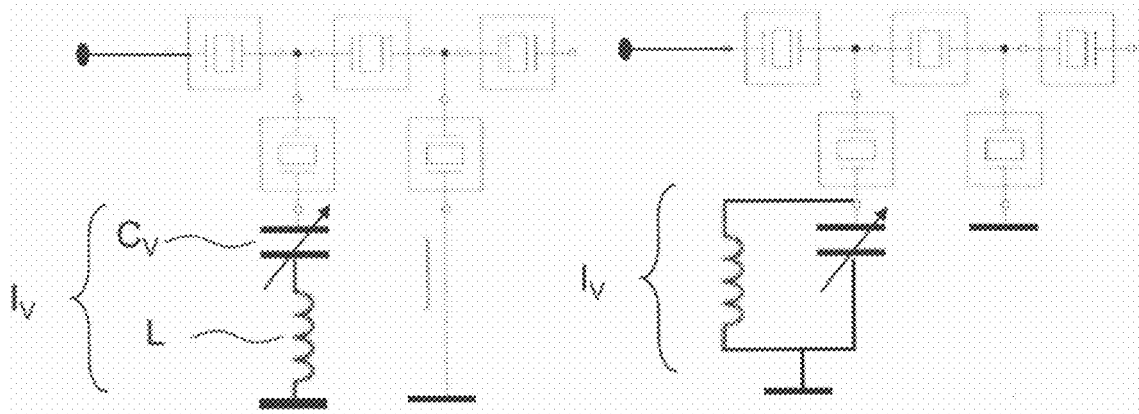
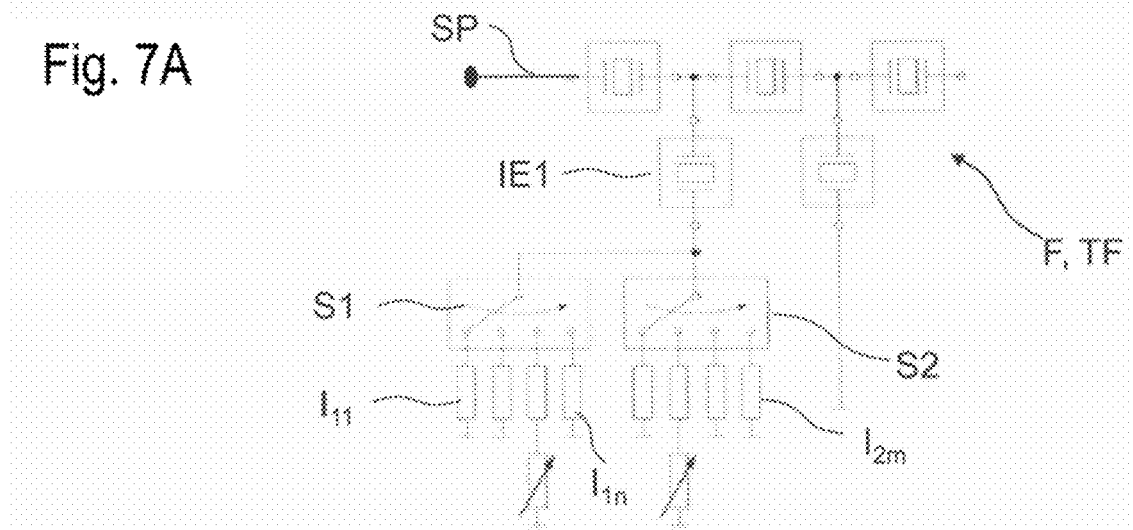

MULTIPLEXER

CROSS-REFERENCE TO RELATED APPLICATIONS

This application is a national stage application under 35 U.S.C. 371 of PCT/US2017/041552, filed Jul. 11, 2017, which claims the benefit of German Application No. 102016114663.3, filed Aug. 8, 2016, both of which are incorporated herein by reference in their entireties.

In order to manage the increasing demand for bandwidth in existing 4G and future 5G networks, the so-called "carrier aggregation" (CA) was introduced. In this aggregation, several mobile radio bands are operated simultaneously in one and the same communication link or data transmission in order to have more bandwidth available. So far, only bands for receive mode are aggregated for carrier aggregation (RX-CA); however, a plurality of band combinations that can also use the CA mode in transmit mode have already been proposed. In the process, CA band combinations can combine several bands for Rx, Tx, or both Rx, Tx at the same time.

Two mobile radio bands to be combined with sufficient frequency spacing can use diplexers for signal separation (generally a high-pass/low-pass combination for separating 1 GHz and 2 GHz bands, for example). Band combinations with more than two different bands or with smaller frequency spacing require multiplexers that can separate several bands in the same frequency range, such as in the 1 GHz range, from one another.

In an n-fold multiplexer, n filters are connected to a common antenna connector. In doing so, however, the losses in the filters also increase with an increasing number n. So that the signals of the different bands or frequencies can be separated precisely and with low losses from one another in the individual filters, it is in particular important, in addition to the minimization of the electrical losses, to maximize the reflectivity of each individual filter for the frequencies of the other bands in order to achieve a good mutual insulation.

Permanently connected quadplexers and higher order multiplexers are known, with which a simultaneous transmit and receive mode in a corresponding number of different bands is possible. However, in doing so, a separate multiplexer is respectively required for each band combination. The multiplexers comprise combinations of permanently connected filters and include matching networks for the respective band combination. If individual bands appear multiple times in different band combinations, such filters are required multiple times in a correspondingly high number as a result, since each band combination requires its own multiplexer and the individual filters or duplexers cannot be used multiple times because of their permanent connection. In addition, reflective losses always occur in the filter or duplexer as a result of a finite reflection of the respective opposite bands.

The task of the present invention is to specify a multiplexer that allows for operation in different bands and band combinations and that is designed for a simultaneous operation in several different bands. In addition, the multiplexer is to produce few additional losses and have a good mutual insulation of the different bands.

This task is achieved according to the invention by a multiplexer having the features of claim 1. Advantageous embodiments of the invention are provided in additional claims.

The fundamental idea of the invention is to provide a reconfigurable multiplexer that allows for the simultaneous connection of individual mobile radio bands as well as combination of bands to an antenna connector and for the provision of the adaptation elements required for the respective combinations in the process.

The multiplexer therefore comprises a plurality of filters, which may be components of duplexers and are respectively associated with a frequency band. Below, a reference to a filter is also to include a duplexer or permanently connected multiplexer, a so-called n-plexer, unless a single filter is expressly referred to.

Furthermore provided is a band switch, which may optionally connect an antenna connector to one or more filters or duplexers at the same time. Between each filter or duplexer and the band switch is arranged an optional phase shifter, with which a suitable phasing of the respective filter or duplexer may be adjusted during multiplex mode if necessary.

In order to improve interband insulation, which can cause problems in certain band combinations, a notch is additionally provided in the multiplexer, which notch can be connected to one of the filters or a partial filter of a duplexer, which notch, at a certain interfering frequency that is to be attributed to an opposite Tx band, generates a pole so that this interfering frequency does not impair the insulation of the respective filter or duplexer. It is also possible to provide in the filter or multiplexer several notches that can respectively generate a pole for filtering out an interfering frequency each.

The term "band switch" in this case also refers to a larger number of individual switches, which respectively connect a band or a signal path with a filter or duplexer associated with a frequency band to a common node. The combination of these individual switches can then constitute the band switch and allow for a large number of different switch positions. Accordingly, the band switch allows for connecting one or any arbitrary number of signal paths or the filters and/or duplexers arranged therein to the common node. The common node is connected to the antenna connector or can be connected to the antenna connector.

If it is mentioned here and below that an element is connected to or coupled with another element, it is not excluded that additional elements can be arranged between them unless a direct connection is expressly referred to.

Each frequency band, or each signal path with the respective filter and/or multiplexer may optionally be associated with a separate phase shifter. Then, even with any arbitrary number of signal paths connected simultaneously to the common node, an optimal phasing for each individual frequency band or for each filter and/or duplexer arranged therein can be achieved. The invention thus makes a multiplex mode possible.

The multiplexer according to the invention has an improved insulation in the respective opposite band, which insulation is improved using the at least one notch. A "notch" is to be understood as a band-stop filter. The notch may also be a means that produces at least one pole in the transmission curve of the respective filter. This pole causes frequencies located in the region of the pole to be effectively suppressed to such an extent that they no longer interfere in the respective opposite band or in the respective filter.

In particular, the notch is connected to a TX filter, which may be arranged as a single filter in a signal path, or to a partial TX filter, which may be arranged in the signal path as part of a duplexer or multiplexer.

A simple possibility of producing a notch in the transmission behavior of a filter consists in manipulating a filter designed in ladder-type technology in one of the parallel branches. By connecting at least one parallel branch of the filter to another impedance, the parallel resonance, or the resonance of the elements arranged in the parallel branch, can be shifted to a desired frequency position that corresponds to the desired pole. Particularly advantageously generated is a pole at a frequency that corresponds to the RX band of an RX filter operated isochronously in multiplex mode. This prevents signals in the opposite band of an RX filter from being able to pass through the notch in the TX mode of the filter with notch and interfering with the respective RX filter.

In one embodiment of the invention, the impedance connected to the parallel branch is an inductance. The resonance frequency of this parallel branch is thus shifted toward lower frequencies. The additional impedance for generating the notch may be connected to the parallel branch in a connectable and disconnectable manner. It can therefore be turned off during normal operation when no multiplexing with a respective RX filter occurs in the band of the notch so that the ladder-type filter exhibits its usual filter behavior optimized for the passband. It is also possible to design the impedance to be reconfigurable or adjustable in order to realize different impedance values with the same component and to thus also generate poles at different frequencies depending on the requirement.

Using a notch, an individual pole can be generated in the transmission behavior of a TX filter or a partial TX filter. However, since several adjacent opposite bands or the respective filters possibly work together with the TX filter during multiplex mode, it is advantageous to provide additional poles or to design the notch such that the frequency position of the notch is variably adjustable to any of several opposite bands. This is achieved in one embodiment of the invention by connecting different impedances to the at least one parallel branch of the TX filter or of the partial TX filter via a switch.

It is also possible to connect several impedances in parallel to a parallel branch of the TX filter using the switch. It is furthermore possible to connect several parallel branches to different impedances selectable via switches. In this way, it is possible to generate an additional, freely selectable parallel resonance by means of an appropriate switch position and to thus generate a pole at a desired position or to shift the pole to another position by switching over.

In one embodiment, the notch is designed as a notch filter and connected in series to the TX filter or partial TX filter. The notch filter may also be shifted with respect to its frequency position by means of connectable impedances. This however has the disadvantage that the insertion loss is also increased thereby.

In another embodiment, the notch comprises an impedance that is connectable to a parallel branch of the ladder-type filter (TX filter) and designed to be adjustable. In this way, it is possible to realize a series of different impedances by means of a single adjustable element and to generate corresponding poles at different frequencies.

The impedance connected to a parallel branch generates a single pole. An impedance connected to another parallel branch can generate additional poles in the filter transmission behavior. In one embodiment, the TX filter therefore comprises impedances that are connected to different parallel branches of the TX filter designed as a ladder-type filter and that can generate different poles. Each of these impedances can be designed to be connectable or disconnectable.

If the notch is designed as a notch filter, connected in series between the band switch and the TX filter, the notch filter can in one embodiment be bridged by a bypass that can be connected and disconnected or locked and unlocked by means of an interrupter switch. When the notch is not required, the bypass is activated so that the notch filter does not generate any additional transmission losses in the signal path.

The phase shifters, which are optionally connected between each filter or duplexer and the band switch, may be designed as phase shifters with a fixed or permanently adjusted, i.e. unchangeable, phase shift. It is however also possible to use phase shifters with variable phase shift.

In one embodiment, at least one of the signal paths with the filter or duplexer arranged therein is connected to a phase shifter with variable phase shift. The other signal paths can also be connected to variable phase shifters or alternatively up to any arbitrary percentage to phase shifters with fixed phase shift. It is also possible to connect the filters or duplexers directly to a band switch if the line between the filter or duplexer and the band switch can act as a transforming element.

Via the phase shifters, a multiplex mode is achieved in several bands that are arranged within the same decade, i.e. for example in the 1 gigahertz range. If a multiplex mode is to occur with additional or different bands arranged in a different decade, a diplexer may be sufficient to separate them. According to one embodiment, the band switch is connected downstream of a diplexer that separates a low-band range from a frequency range located above it. The diplexer is preferably a combination of a high-pass and a low-pass filter.

According to another embodiment, a second diplexer that once again splits one of the two ranges separated by the first diplexer can be connected in series to the first diplexer. Triplexers that split the signal delivered by the antenna into three frequency ranges and assign it to the corresponding signal paths and filters may also be used likewise instead of the first diplexer. Higher order multiplexers are also possible in principle.

A band switch can respectively be connected to the two outputs of the first diplexer, via which band switch at least one signal path can respectively be connected to the output of the diplexer. If a second diplexer is additionally connected in series to the first diplexer, both outputs of the second diplexer are available for connection with band switches, while one output of the first diplexer allows for the connection to the second diplexer.

In such a construction (e.g. triplexers or two diplexers in series), three frequency ranges are separated passively without special adaptation elements for phase adjustment being required to this end. A correspondingly higher order multiplexer may also passively separate more than three frequency ranges.

If a band switch connected to several signal paths is provided at an output of a diplexer, the corresponding signal paths or the filters or duplexers arranged in the signal paths are brought to such a phasing by means of a phase shifter that they do not negatively impair the other frequency bands.

As mentioned, each band switch can comprise one or more single-pole switches, which can respectively connect one filter or one duplexer or one multiplexer to either the antenna connector or a permanent termination. In case of a disconnected signal path, a permanent termination has the advantage that the common node is connected to a defined potential and thus exhibits defined properties.

In one embodiment of the invention, the multiplexer is designed for carrier aggregation band combinations, in which at least two duplexers are connected simultaneously to the common node and the common node is connected to the antenna connector or to a diplexer, triplexer, or generally multiplexer connected therebetween.

The multiplexer can also be designed for carrier aggregation band combinations comprising more than two bands.

A multiplexer that makes possible the carrier aggregation mode of at least two duplexers is then designed as quadplexer or a higher order multiplexer. Several or all phase shifters are then advantageously designed to be reconfigurable, i.e. with variable and adjustable phase shift. It is furthermore advantageous to in this case design the notch of one or more of the TX filters or partial TX filters that are operated jointly in carrier aggregation to be reconfigurable.

A reconfigurable notch at each signal path and a reconfigurable phase shifter have the advantage that the optimal conditions can be adjusted for each arbitrary band combination in multiplexer or carrier aggregation mode. During optimal operation of a multiplexer, few or only slight losses are generated, a high insulation is achieved, and a good stop-band suppression is obtained in the respective signal path.

The invention will be explained in greater detail below with reference to exemplary embodiments and the associated figures. The figures are used solely for a better understanding of the invention, and are therefore partially illustrated only schematically. In particular in block diagrams, only the components which are either required for the invention or to which reference is made in particular may be illustrated.

Shown are:

FIG. 1 a block diagram of a multiplexer according to the invention,

FIG. 2 the passband curve of a partial TX filter at an output with and without notch, FIG. 3 the insulation of a TX filter for band 26 compared to the RX band of band 12 in a multiplexer according to the invention, FIG. 4a sectional view of a signal path with a duplexer with switchable notch, FIG. 4b sectional view of a signal path with a duplexer with adjustable notch, realized as a series connection, FIG. 4c sectional view of a signal path with a duplexer with adjustable notch, realized as a parallel connection, FIG. 5 sectional view of a ladder-type filter with a parallel inductance serving as a notch, FIG. 6a a ladder-type filter with a switchable parallel impedance, FIG. 6b a ladder-type filter with an adjustable parallel impedance, FIG. 6c a ladder-type filter with an adjustable capacitor.

FIG. 7a a ladder-type filter with an improved switchable parallel impedance,

FIG. 7b a ladder-type filter with an improved adjustable parallel impedance,

FIG. 7c a ladder-type filter with a combination of adjustable and switchable parallel impedance, FIG. 7d a ladder-type filter with an adjustable pole realized as parallel connection of an inductance and a capacity, FIG. 7e a ladder-type filter with a combination of adjustable inductances and adjustable capacities connected in parallel, FIG. 8 four examples for a phase shifter realized from three impedance elements as well as four examples for a phase shifter realized from two impedance elements, the inductances and capacities of which phase shifter are optionally adjustable, FIG. 9 two examples for a voltage divider circuit, which may be used as phase shifter, wherein the capacities are optionally adjustable, FIG. 10 two examples for a phase shifter circuit consisting of four impedance elements, wherein the capacities are optionally adjustable, FIG. 11 a multiplexer circuit according to the invention with several switchable notches, wherein the phase shifters are adjustable, FIG. 12 a multiplexer circuit, which separates two additional signal paths via two diplexers, FIG. 13 a multiplexer circuit with a band selector switch, which can individually or in multiplex mode connect a plurality of signal paths respectively associated with a band to an antenna connector, FIG. 14 a multiplexer circuit with a connection of different band selector switches and a triplexer, which allow for a multiplex mode, and optionally adjustable phase shifters, FIG. 15 another multiplexer circuit with a triplexer and band selector switches, which allow for a multiplex mode.

In a first exemplary embodiment, a multiplexer is specified, with which simultaneous operation in two bands is possible, wherein both combinable bands are respectively located closely adjacent to each other. The multiplexer is to cover the band combinations 26+12, 26+13, 26+B28a, 26+B28b, and 26+29 for a carrier aggregation mode including these bands. The respective frequency ranges for RX and TX bands are specified in table 1.

TABLE 1

| Band | Tx (MHz) | | Rx (MHz) | | |
|---|---|---|---|---|---|
| 26 | 814 | 849 | 859 | 894 | FDD |
| 12 | 699 | 716 | 729 | 746 | FDD |
| 13 | 777 | 787 | 746 | 756 | FDD |
| B28A | 703 | 733 | 758 | 788 | FDD |
| B28B | 718 | 748 | 773 | 803 | FDD |
| 29 | N/A | | 717 | 728 | FDD |

Without the invention, the problem mentioned above would be solvable by the use of four quadplexers and one triplexer. This would however mean that the filter for band 26 is present in a several times redundant manner and practically in each of the quadplexers.

With two hexaplexers, a joint operation in the aforementioned band combinations could also be realized, for example a first hexaplexer for band 26, band B28a, and band 13, and a second hexaplexer for band 26, 12, and B28b. Such a solution is mathematically feasible, since the frequency bands do not overlap. Technically, problems probably arise since band 13 RX ends at 756 megahertz, for example, while B28a RX starts at 758 megahertz. A band gap of two megahertz is probably not realizable with today's technologies.

FIG. 1 now shows a multiplexer according to the invention, with which two duplexers can respectively be operated in parallel, wherein each duplexer comprises two bands, namely an Rx and an associated Tx band. In this case, only one filter or one duplexer is now installed for each band.

By means of a band switch BS, which is composed in FIG. 1, for example, but not obligatorily of two individual switches BS6, BS1, a sixth signal path SP6 (e.g. with a duplexer for band 26), together with another signal path selected from the first to fifth signal path SP1 to SP5 (e.g. respectively with a duplexer for band 12, 13, 28A, 28B and a filter for band 29), can be connected to a common node GK. The band switch can connect in one switching operation several signal paths simultaneously to the common node GK or to an antenna connector or disconnect them again from it. The illustration shown here serves to clarify the concept.

The common node GK is connected to an antenna connector, in the embodiment shown via a diplexer DI1 connected therebetween. Via the high-pass filter of the diplexer, another higher band (e.g. band 1, 3, 7, or other 2 GHz bands) or a plurality of additional bands can be separated.

In each signal path SPn, an optional phase shifter PSn is connected between the band switch BS and the respective filter Fn or the respective duplexer Dn. In the exemplary embodiment shown, all phase shifters have a fixed configuration, thus respectively generate a defined phase shift. It is however also possible that the phasing of the duplexer following the optional phase shifter is already suitable so that a phase shifter does no longer provide any advantage. Possible are also adjustable or reconfigurable phase shifters or switchable phase shifters.

Since, in all band combinations, the duplexer D6, in this case designed for band 26, can be combined with a duplexer D1 for band 12 or D2 for band 13 or D3 for band 28a or D4 for band 28b or a filter F5 for band 29, the desired phase shift can be adjusted via a maximum total of respectively two phase shifters connected to the common node GK. The phase shifter(s) are however optional and can be omitted for such configurations, in which the phasing is innately already suitable.

Each switch also comprises, in addition to the contact point that connects the signal path to the common node GK in the open state, a terminating impedance IT, which connects the signal path in a defined manner to a ground connector in the closed switch state. The terminating impedance may be a resistor or an inductance or another optional impedance.

To a multiplexer as just described, different quadplexers can indeed be connected by a combination of respectively two duplexers, but the different bands have a relative small insulation of only about 45 dB, which is a dissatisfying and insufficient value for a mobile radio system.

FIG. 2 shows the transmission curve for band 26 TX, i.e. the partial TX filter of the band-26 duplexer D6. The dashed lines indicate the frequency ranges of the adjacent RX bands. Two curves are reproduced in the same illustration, wherein curve 1 indicates the transmission function of the arrangement shown in FIG. 1 without additional measure, while curve 2 indicates the transmission function of the multiplexer with another measure described below.

FIG. 3 shows the insulation of band 26 TX after band 12 RX. Curve 1 again reflects the behavior of the multiplexer of FIG. 1 without additional measure for improving the insulation. Curve 2 on the other hand shows the behavior of the multiplexer of FIG. 1 with a measure described below for improving the insulation.

In order to improve this so-called opposite band insulation, a suitable pole is now generated according to the invention, e.g. in the TX filter for band 26, i.e. in the partial TX filter of the duplexer D6, by a notch, indicated in FIG. 1 by N6, appropriately adjusting the transmission curve in the desired frequency range. The curves 2 in FIGS. 2 and 3 represent such an improved duplexer with a notch N6 in the partial TX filter of the band-26 duplexer D6.

Curve 2 in FIG. 2 with the notch according to the invention is substantially lower in the lower stopband than curve 1 of the same multiplexer without notch.

FIG. 3 shows that in the desired opposite band, i.e. in the band-12 RX frequency band, the insulation of the B26 TX filter is significantly improved, in this case to a value of about 55 dB. This is completely sufficient for a mobile radio system.

The notch N described can generate a defined pole with a certain frequency. It is however advantageous to generate a variable pole.

FIG. 4a shows a possibility of optionally connecting the partial TX filter TFTX of a duplexer D, for example of the duplexer D6 for band 26, to different impedances I in order to generate poles at different frequencies, which poles respectively bring about the required opposite band insulation for a given band combination. If the duplexer D is, for example, provided for six different band combinations, which are to be operated at the same time, six different impedances I1 to I6 can be provided in order to optionally connect them to the partial TX filter TFTX by means of a switch.

Another impedance can be provided in order to allow for the optional single-band mode.

Since the notch exclusively affects the behavior of the partial TX filter, the other components of the multiplexer can remain unchanged. FIG. 4a shows the signal path with the duplexer D provided with a notch N, and a phase shifter PS, via which the duplexer D is connected to a band switch BS. The band switch can connect the signal path to the common node GK or disconnect it from the common node and set it to a permanent termination. A control unit CTR controls the switch S, the optional phase shifter PS, and the band switch BS.

FIG. 4b shows almost the same circuit as FIG. 4a but with the difference that the notch N connected to the duplexer D can be adjusted to a desired frequency position by means of an adjustable impedance. In the figure, the adjustable impedance comprises a series connection of an adjustable capacity $C_V$ and an inductance. A control unit SE can control both the adjustable capacity and the phasing of the phase shifter PS. The phase shifter PS is in this case arranged in the signal path between the band switch BS and the duplexer D. In this case, a control unit CTR controls the adjustable capacitor $C_V$, the phase shifter PS, and the band switch BS.

FIG. 4c shows a variant of FIG. 4b with a differently designed adjustable impedance in notch N. The adjustable impedance $I_V$ is a parallel circuit of an adjustable capacity $C_V$ and an inductance L.

FIG. 5 shows a simple possibility of realizing such a notch N in a filter F or partial filter TF designed in a ladder-type arrangement. To this end, a corresponding impedance I1 is connected to the parallel impedance element IE1, which is designed, for example, as a parallel resonator. The other parallel branches of the filter with the respective impedance elements IE can remain unchanged. It is however also possible to connect additional impedances I to additional parallel branches in order to generate, if necessary, additional notches, i.e. additional poles in the transmission function of the filter.

While FIG. 5 shows a fixed connection of the ladder-type filter F, TF to the impedance I serving as notch, FIG. 6a provides a possibility of selecting a suitable impedance I from a series of available different impedances by means of a switch S and to thus generate a notch or a pole at the desired position in the frequency spectrum. The filter shown is, for example, the Tx filter of the duplexer D6 for band 26 of FIG. 1. It is also possible to design one or more of these impedances $I_n$ to be adjustable. FIG. 6a shows, for example, a series connection of an impedance I to a variable impedance $I_V$ at one output of the switch.

In FIG. 6b, a parallel branch of the ladder-type filter is connected to a series circuit of an adjustable capacitor $C_V$ and an inductance L, which together form an adjustable or variable impedance $I_V$.

The variable impedance can however also be connected directly to an output of the switch. Depending on the bandwidth, within which the impedance must be adjusted, several variable impedances $I_V$ may be required in order to generate the desired poles at the desired positions in the TX filter of partial TX filter.

A notch for generating a variable pole can be generated with adjustable inductances or in general with adjustable impedances. An impedance is therefore designed in FIG. 6 as a fixed element, for example as inductance I, and connected in series to an adjustable element $I_V$, e.g. an adjustable capacitor. The adjustable capacitor can be designed in CMOS technology, made of gallium arsenide GaN or another III-V material, of BST or designed as MEMS component in order to only mention a few possibilities. The number of connectable different impedances I for the adjustable notch for generating a variable pole is based on the application and variable.

A switch S with too many switch positions can produce losses just like the inductance. In order to provide a remedy, two switches S1, S2 can be connected in parallel and connected to the parallel branch of a ladder-type filter. FIG. 7 shows such an arrangement. Each switch S1, S2 can connect the parallel branch to a single of a plurality of impedances $I_{11}$-$I_{1n}$. The impedances I can be fixed impedances. It is however also possible, as already explained using FIG. 6 and indicated in FIG. 7, to connect a fixed impedance to a variable impedance at the output of one of the switches. The possibility also exists to connect two or more impedance elements in parallel, as a result of which their losses are reduced. For example, one of the impedance elements I can respectively be connected to one another in parallel via the first and the second switch. Optionally, only one impedance element can be selected via switch S1 and terminated in a defined manner via the other switch S2. A fixed and a variable impedance element may also be connected in parallel via the first and second switch.

Figure 4A:
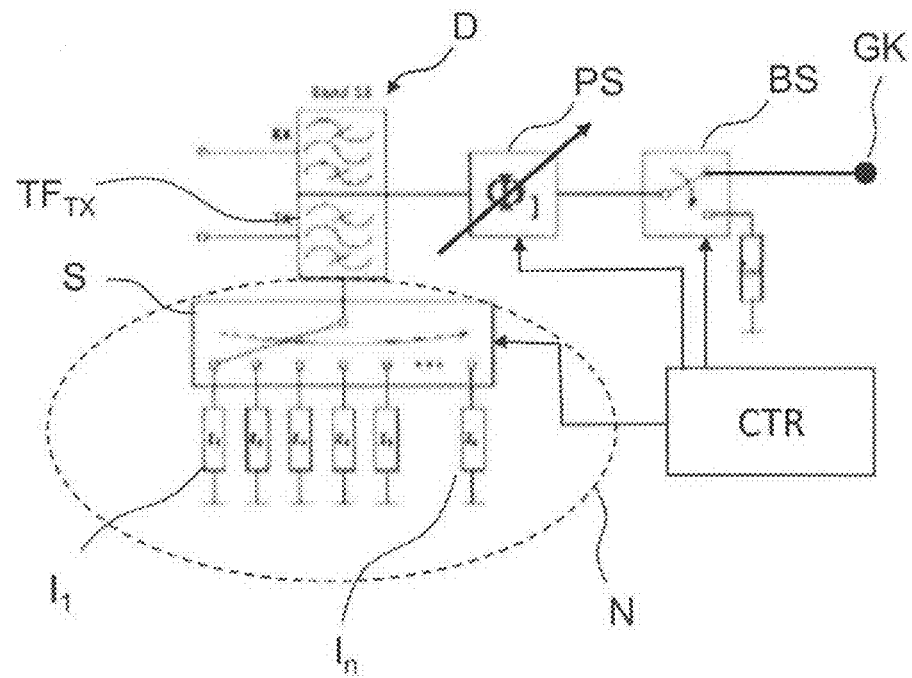
Figure 4B:
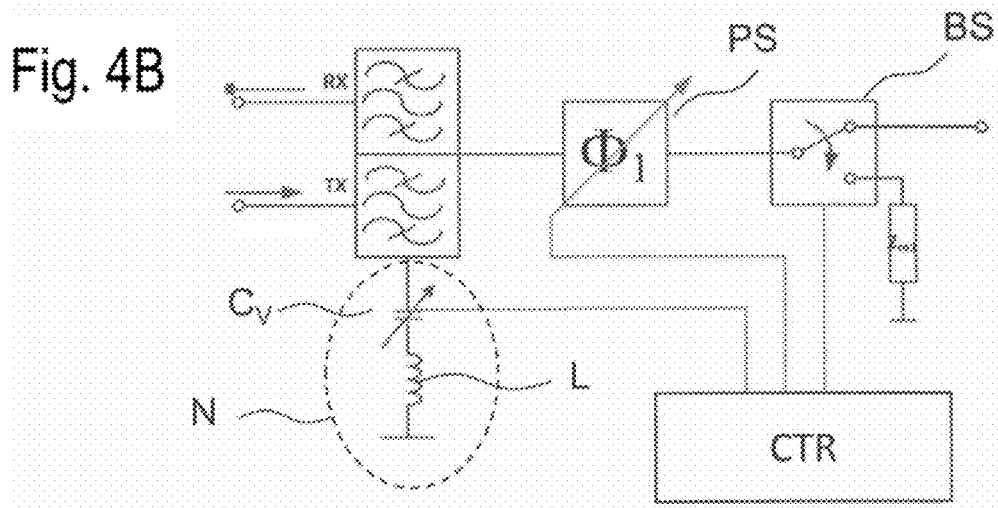
Figure 4C:
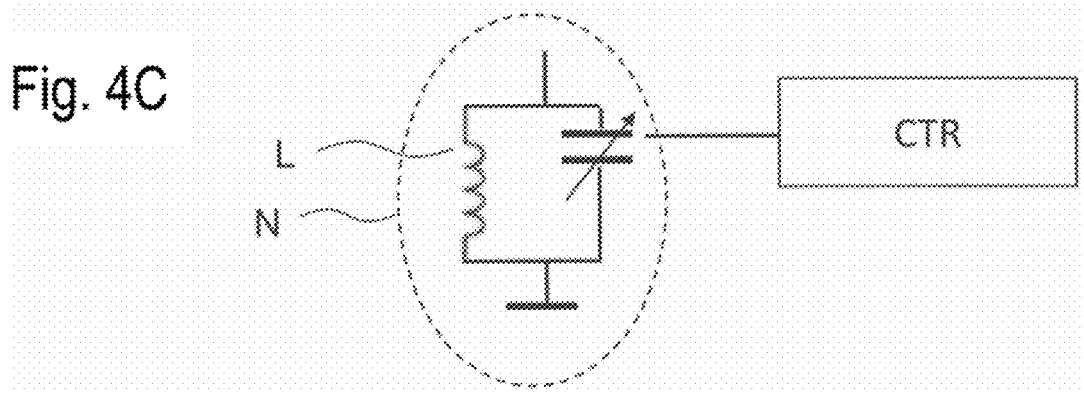
Figure 7B:
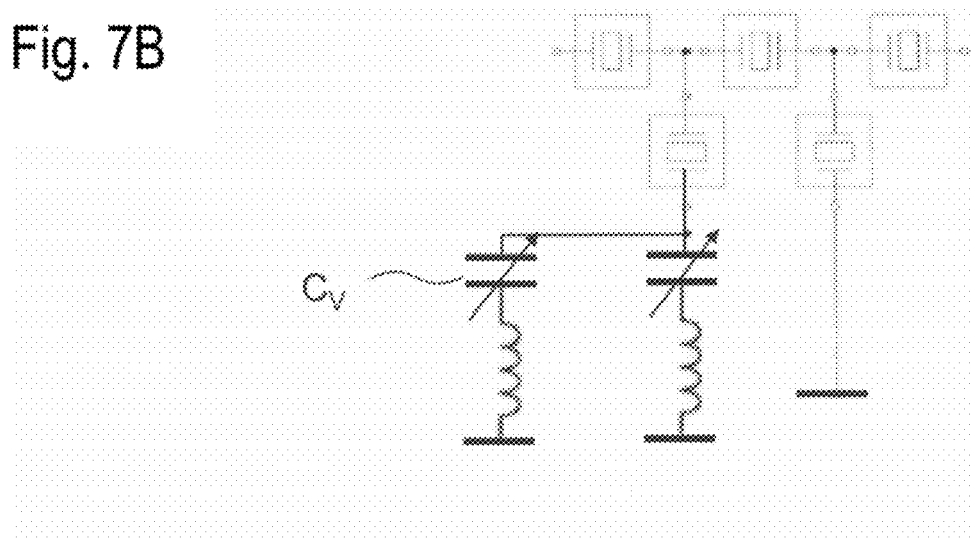

FIG. 7b shows two adjustable impedance elements, which are connected in parallel to one another and in series to a parallel branch in a manner reducing losses. As in FIG. 4b, the adjustable impedance is, for example, a series circuit of an adjustable capacity and an inductance. At the resonance frequency of this series oscillator circuit, a notch forms, the frequency position of which can be adjusted by an appropriate adjustment of the capacitor.

Overall, the solution with two parallel switches S1, S2 generates significantly lower losses than an arrangement with only one switch S, which losses can be lower by a factor of up to 2. In this case, the losses are composed of losses in the switch and losses of the connected impedance caused by the finite quality of the impedance elements used.

Figure 7C:
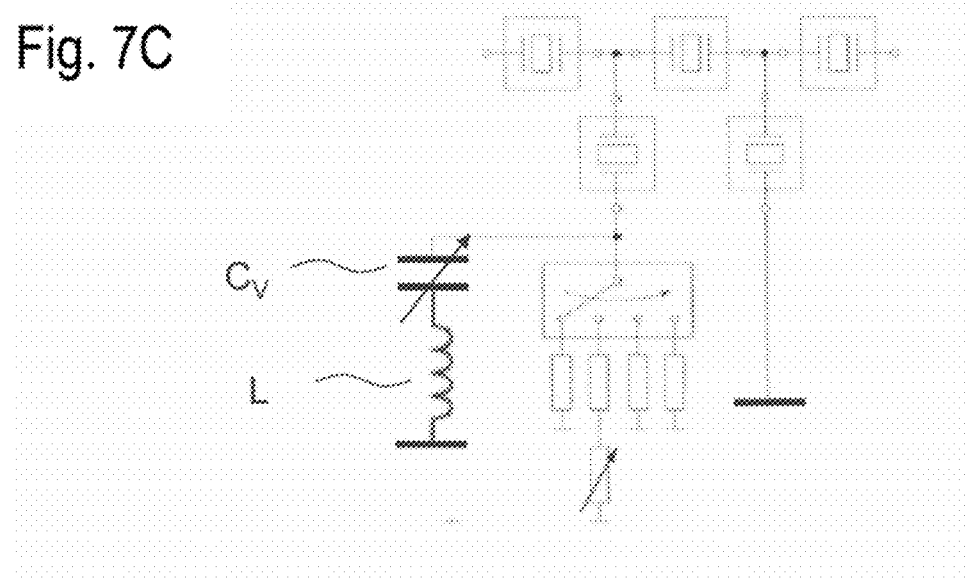

FIG. 7c shows an embodiment, in which an adjustable impedance can be connected in parallel to an additional impedance with a given value. The additional impedance is selected or connected by means of a switch. By selecting the additional impedance with the desired value, the variation range of the adjustable impedance is expanded so that the notch can be generated or shifted across a large frequency range.

Figure 7D:
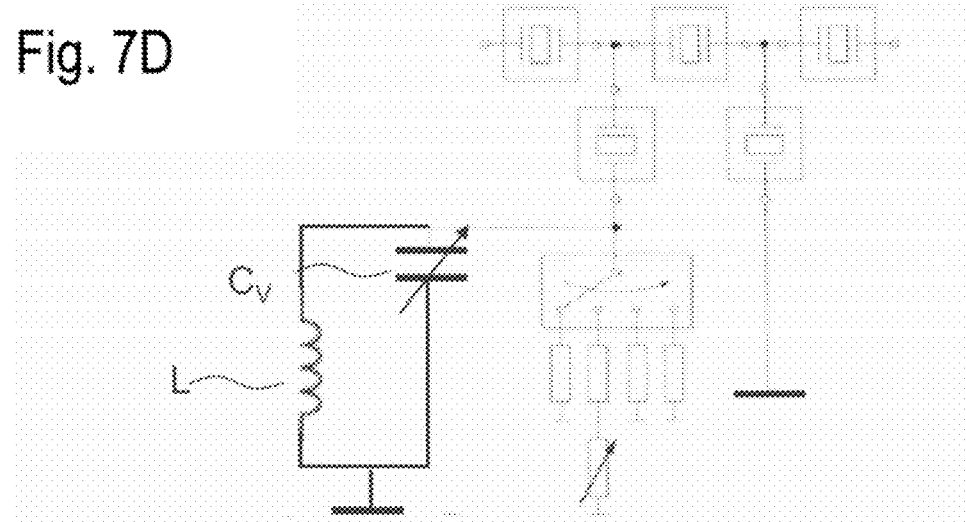

FIG. 7D is a variant of FIG. 7C, wherein the series circuit of an adjustable capacitor $C_V$ and an inductance L is replaced by a parallel circuit of an adjustable capacitor $C_V$ and an inductance L.

Figure 7E:
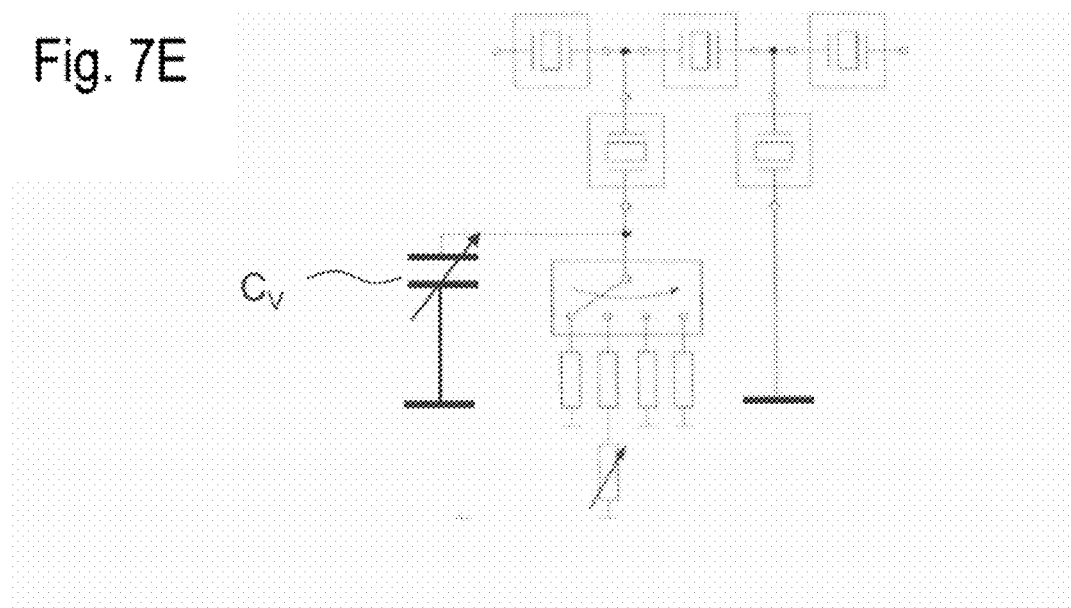

FIG. 7E is a variant of FIG. 7C, wherein the adjustable capacitor $C_V$ is connected in parallel to the switched inductances L1, L2, L3 . . . .

Additional combinations can be derived directly from these examples.

As already mentioned, only one of the parallel branches of a ladder-type filter may be connected to a notch N, which then accordingly comprises impedances I selectable via a switch. It is also possible to generate an additional notch at additional parallel branches, which notch generates a pole that is located at a different frequency than the pole of the first parallel branch with the first notch.

Figure 1:
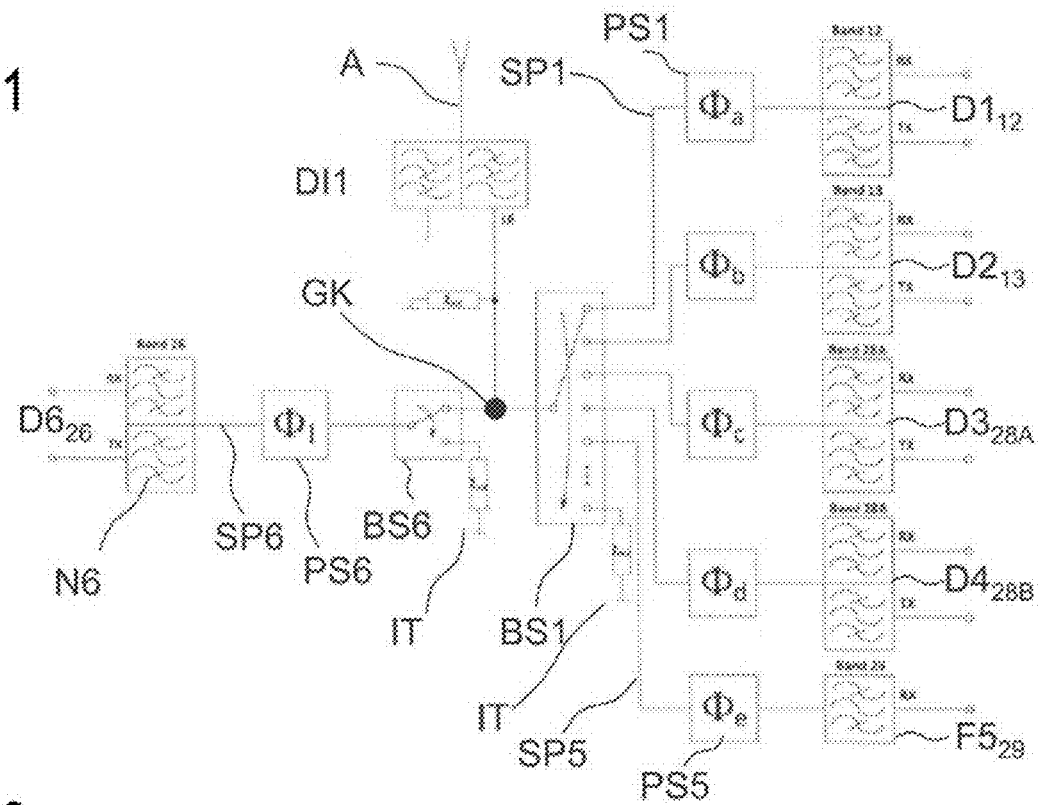
Figure 2:
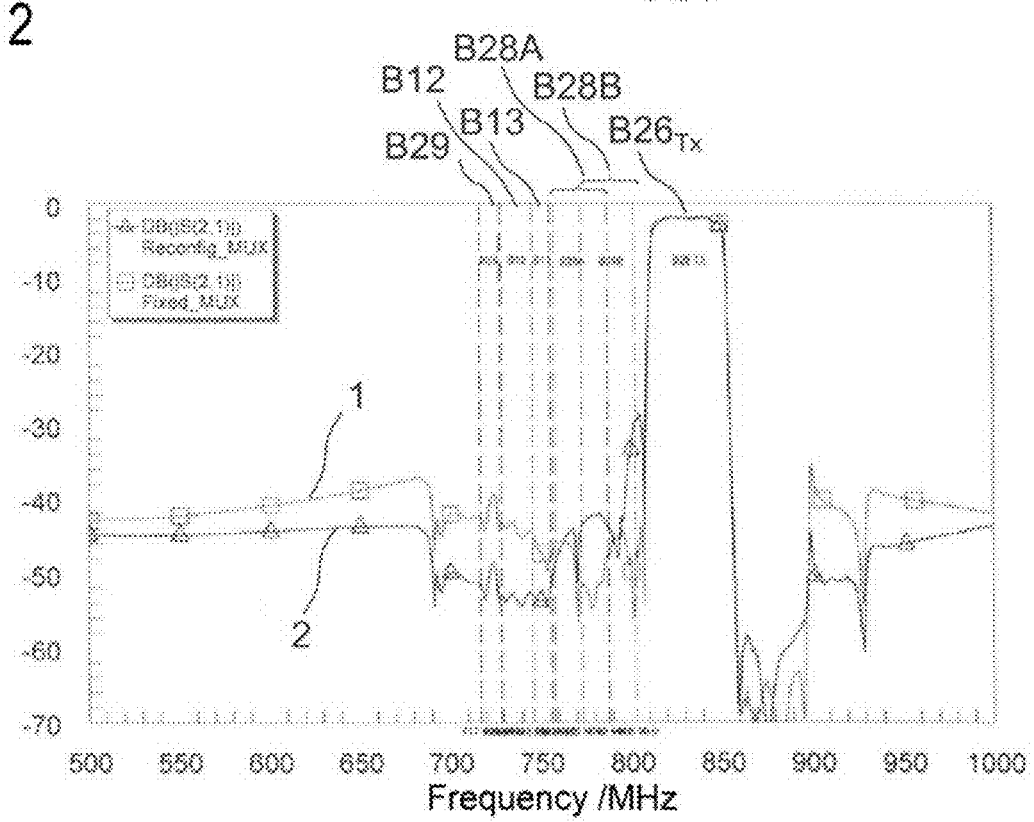
Figure 3:
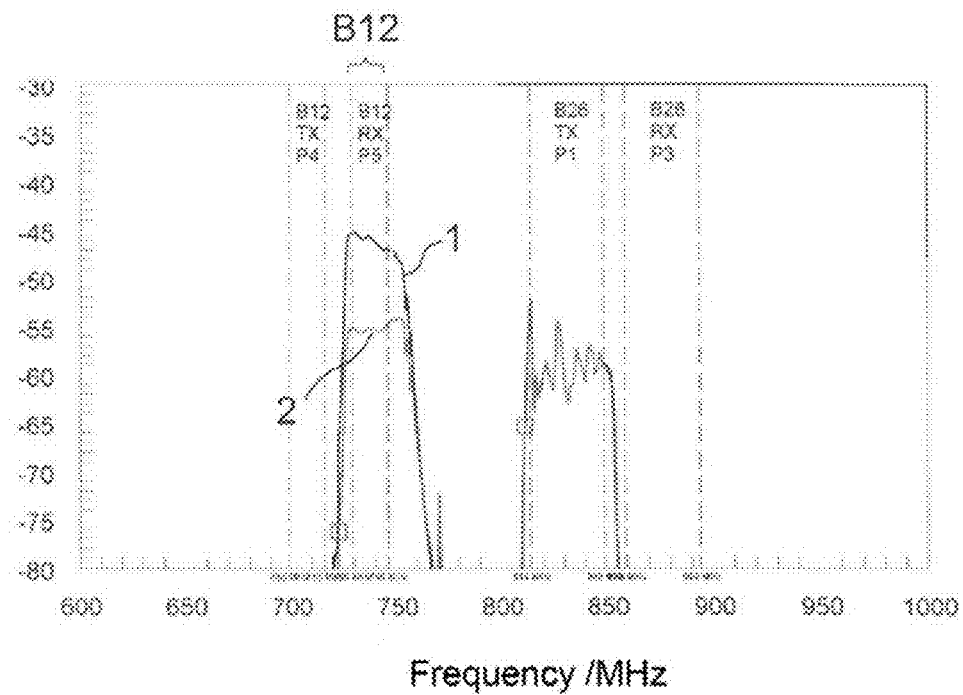

The phase shifter PS6 in the signal path SP6 with the band-26 duplexer D6 (see FIG. 1) on the other hand has the task of shifting the phasing of band 26 for the different quadplexer possibilities in an appropriate manner so that the quadplexer performance is optimal. A phasing at the common node GK or at the antenna connector A is optimal if the aggregated bands, i.e. the bands jointly operated synchronously have an idle state at the frequency of the respective opposite band. Losses are reduced thereby, since the energy of the opposite band is reflected appropriately and can be supplied to the actual duplexer.

Depending on the design or the phasing of the band 26 duplexer D6, it is possible to realize the phase shifter PS6 in a fixed manner, i.e. by means of fixed elements, to design it with a switch and various impedances in a configurable manner, or to form it by using adjustable elements as adjustable phase shifters.

Figure 8:
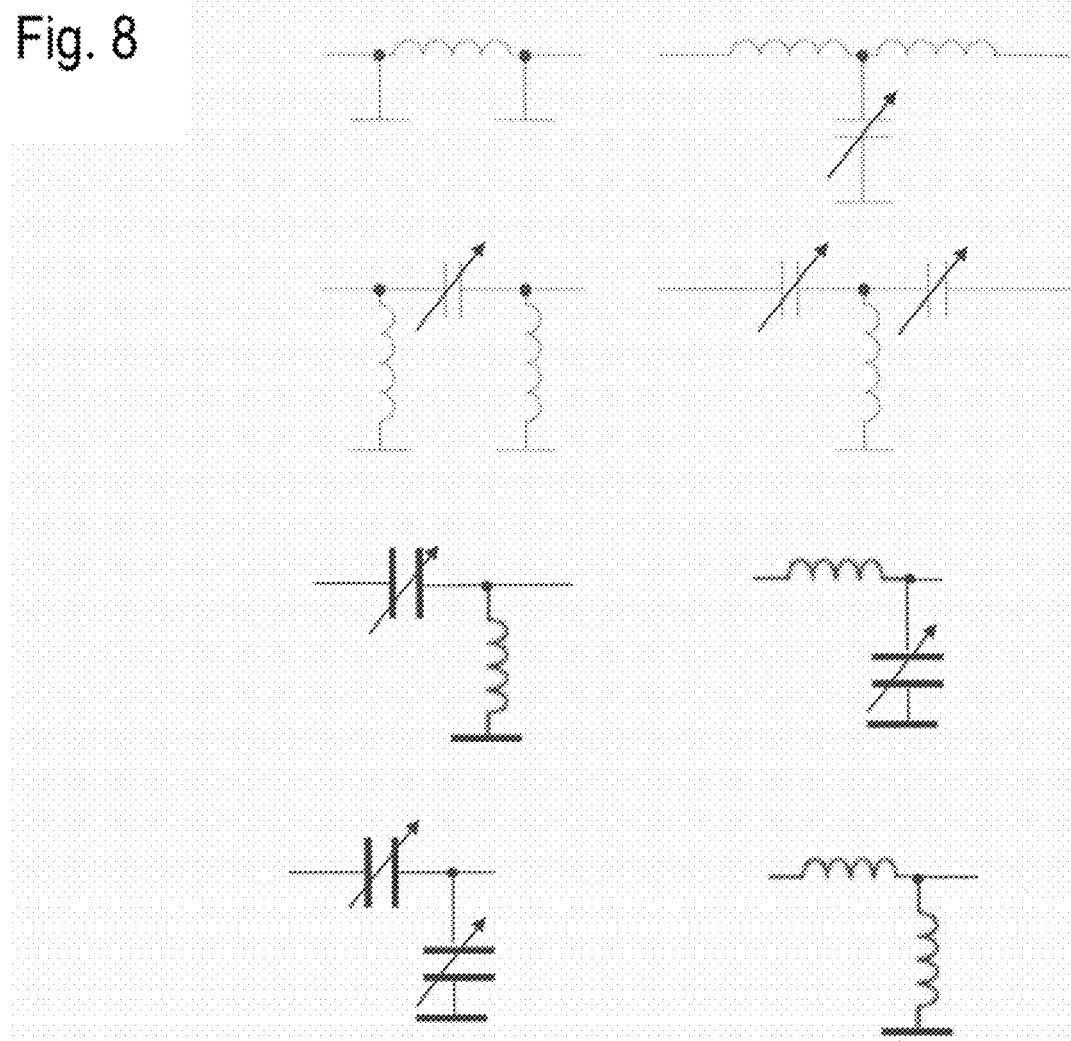

FIG. 8 shows, by way of example, different possibilities of designing a phase shifter PS usable for the invention from three or two impedance elements. Read from the top to the bottom and from left to right, these are, for example, a low-pass pi circuit comprising three impedance elements, a low-pass T circuit, a high-pass pi circuit, and a high-pass T circuit. As shown, two impedance elements can form L elements, in which an impedance element is connected in a series branch and another impedance element in parallel thereto. If one or more adjustable impedance elements are used, the phase shifter can also be adjusted thereby. Furthermore, individual impedance elements can also be used as phase shifters. Optionally, individual capacitors of the fixed capacitors C may be replaced by adjustable capacitors $C_V$. If adjustable components can only be realized with difficulty, they can also be realized by switched capacitors or inductances. The phase shifter can also be designed to be switchable in order to bring about higher phase shifts, for example. This applies in particular to the examples according to FIGS. 8, 9, and 10.

Figure 9:
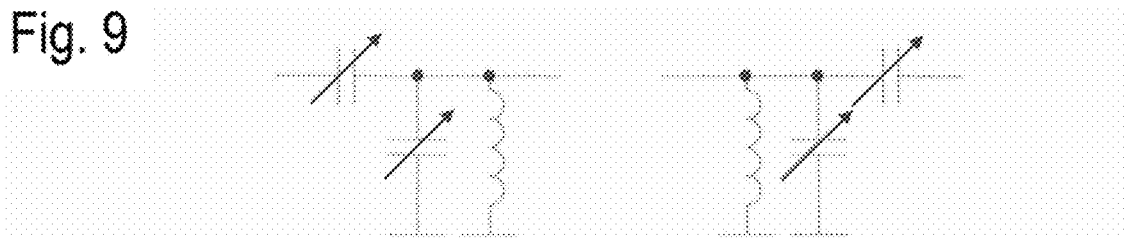

Capacitor divider circuits can also be used instead of the phase shifter. FIG. 9 shows two possibilities of realizing a capacitor divider circuit as a replacement for a phase shifter.

Figure 10:
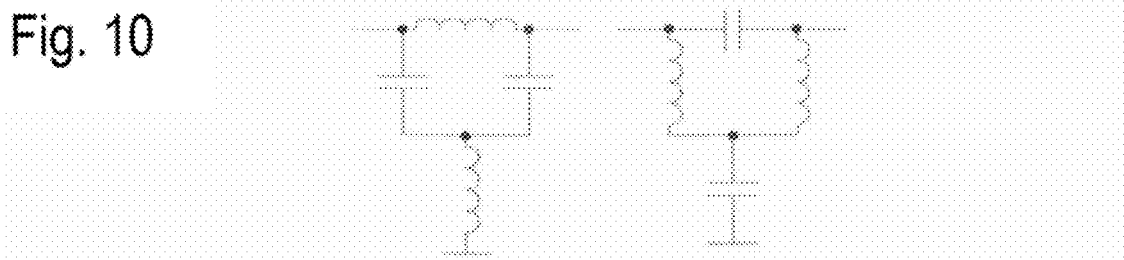

FIG. 10 shows two possibilities of producing an ideal phase shifter from four impedance elements. These two phase shifters respectively have an all-pass structure, thus are designed neither as a high-pass nor as a low-pass filter.

In principle, a phase shifter can have an almost arbitrary structure or an arbitrary connection of R, L, and C elements or can even comprise such individual elements. All elements that shift the phasing are effective as phase shifters. The elements can optionally again be designed to be switchable and/or adjustable.

A reconfigurable phase shifter can be produced by means of reconfigurable impedance elements, which then replace one or more of the fixed impedance elements in one of the structures shown in FIGS. 8 to 10. Which elements are designed to be reconfigurable depends on the respective application. In principle, switches can in particular also be inserted into all structures shown in order to switch individual elements. Adjustable elements, such as adjustable capacitors or adjustable inductances, can however also be used. It is however also possible to use a combination of switches and adjustable elements.

Figure 11:
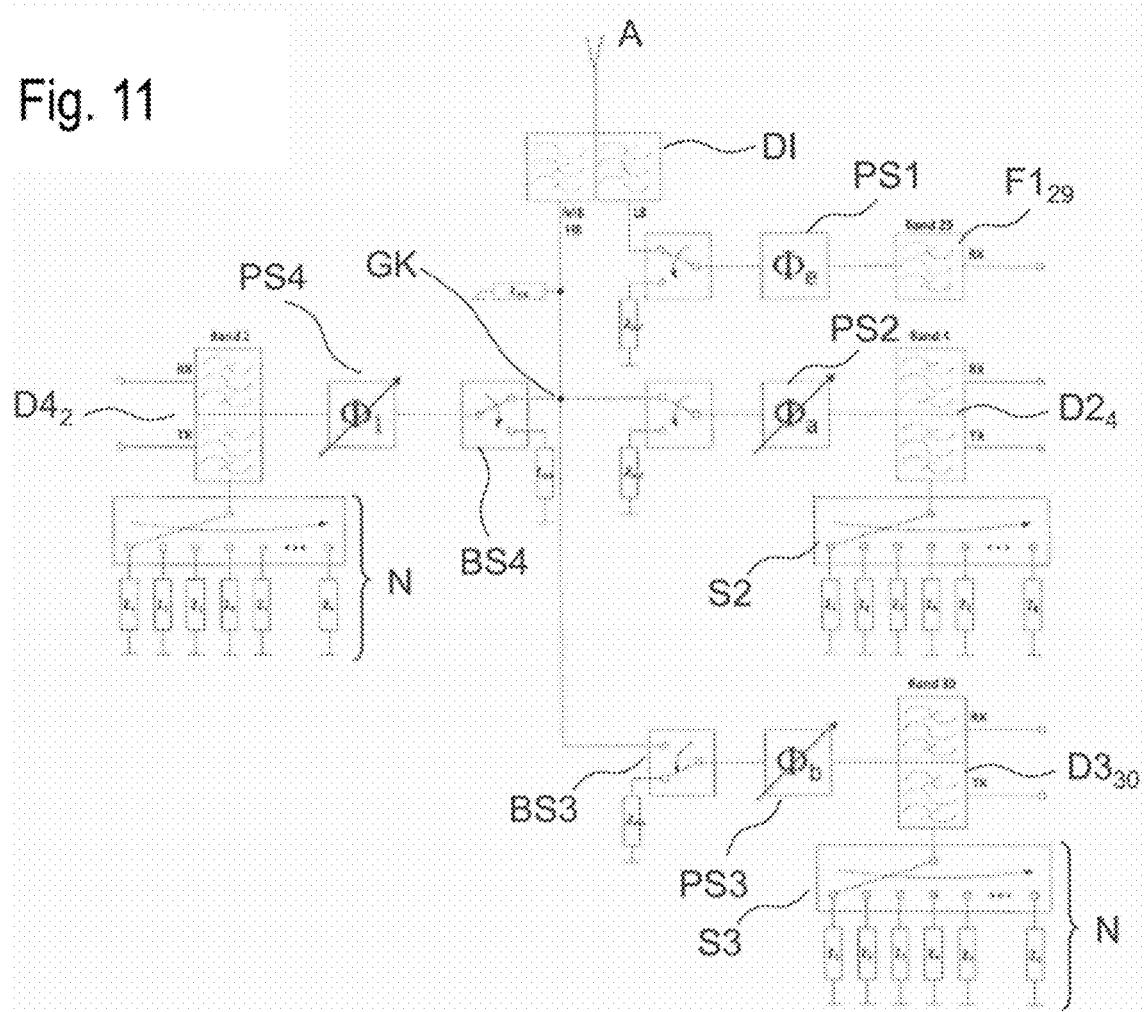

FIG. 11 illustrates a completely reconfigurable multiplexer purely by way of example, in which multiplexer three signal paths are connected to a common node GK. Each of the signal paths comprises a duplexer D2-D4 and a variable phase shifter PS2-PS4. Each of the three duplexers D2-D4 is connected to a reconfigurable notch N, which can generate a pole at a desired position in the filter behavior. Each of the signal paths can be connected to the common node GK by means of a band switch BS2-BS4.

The common node GK is connected to a diplexer DI and via the diplexer to an antenna connector A. The second output of the diplexer DI is connected to another signal path, which can be connected and disconnected via a band switch BS1. In the signal path, a phase shifter PS1, in particular with a fixed phase shift, is installed and connects the output of the diplexer to a filter F1 or a duplexer.

In an exemplary embodiment, an RX filter $F1_{29}$ for band 29 is provided in this signal path. The other signal paths can then comprise a band-2 duplexer $D4_2$, a band-4 duplexer $D2_4$, and a band 30 duplexer $D3_{30}$. With this construction, a series of carrier aggregation band pairings can be realized in a flexible manner.

It is, for example, possible to operate all bands or duplexers or filters in single mode. In doing so, only one signal path with the appropriate filter or duplexer is connected to the antenna connector A. These are the aforementioned bands 2, 4, 29, and 30.

It is also possible to adjust a carrier aggregation, in which two signal paths can be connected simultaneously to the antenna connector so that different quadplexers are obtained. With the arrangement of FIG. 11, the combinations of band 2 and 4, 2 and 30, and 4 and 30 are, for example, possible.

With an arrangement according to FIG. 11, it is also possible to simultaneously unlock three parallel signal paths with the respective three different frequency bands for a carrier aggregation mode. With the arrangement of FIG. 11, combinations of the bands 2, 4, and 29 or alternatively 2, 4, and 30 are, for example, possible.

The reconfigurability of the multiplexer additionally allows for adjusting a carrier aggregation mode in four bands in parallel, i.e. a simultaneous operation in the bands 2, 4, 29, and 30.

Band 29 is a low band and can passively be separated from the other signal paths via the diplexer. The remaining bands or signal paths with the bands 2, 4, and 30 can be connected to each other in a flexible manner. In this way, it is possible to produce a completely reconfigurable multiplexer from the components of variable phase shifters, band switches, and variable notches in any combination.

Figure 12:
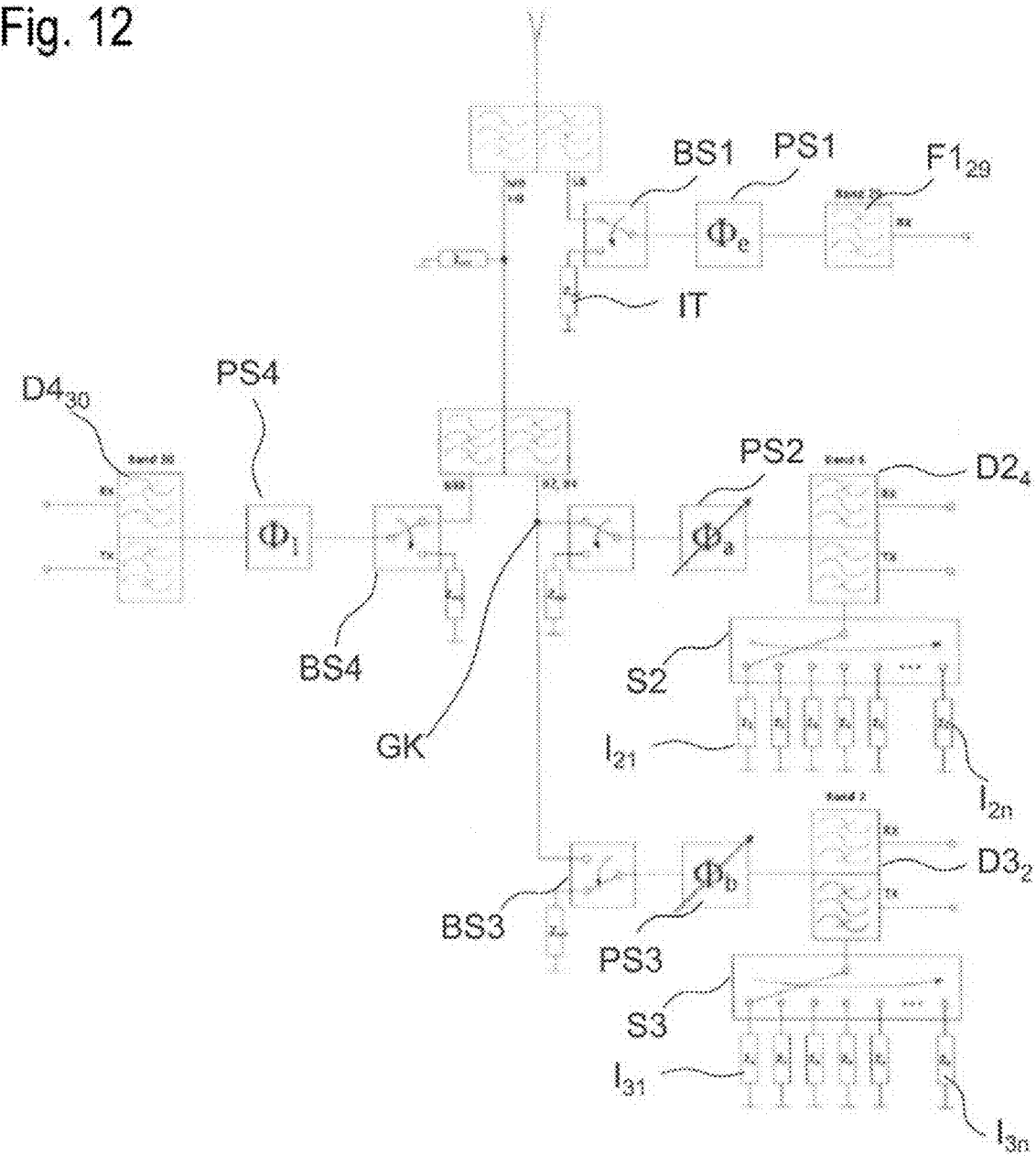

FIG. 12 shows another embodiment of the arrangement of FIG. 11. The illustrated multiplexer according to the invention comprises two diplexers DI1, DI2. While the first diplexer DI1 is designed to separate band 29, the second diplexer DI2 serves to separate bands 2 and 4, namely also by means of a low-pass filter. The other output can, for example, be connected to a signal path for band 30, for example.

To the low-pass filter of the second diplexer DI2 is connected a common node GK, which the branching point for the second and third signal path, in which the second duplexer $D2_4$ for band 4 or the third duplexer $D3_2$ for band 2 are respectively arranged. Each of these two signal paths is again connectable to the common node or disconnectable via a band switch BS2, BS3.

Between the band switches BS2, BS3, and the duplexers D2, D3, adjustable phase shifters PS2, PS3 are again respectively arranged. Respectively connected to the TX filters of the second duplexer D2 and of the third duplexer D3 is a switch S2, S3, via which impedances I2, I3 can be selected in order to generate a corresponding pole in the pass behavior of the TX filter of the respective duplexer.

The first filter $F1_{29}$, which, for example, is an Rx filter for band 29, the signal path of which is connected to the low-band output of the first diplexer DI1, is passively separated via the diplexer DI1 and does not require any additional measure in order to improve the insulation. The same is true for the fourth signal path with the fourth duplexer $D4_{30}$ for band 30, which is connected to the high-band output of the second diplexer DI2 via a band switch BS4. All signal paths however comprise a phase shifter PS, which can however be fixed in the first and fourth signal path and does not need to be variably adjustable.

The phase shifters in the signal paths with the duplexers D1 and D4 to D7 can optionally also be designed as adjustable phase shifters.

The variable capacitors, which connect the respective partial Tx filter in series to an inductance to ground, can furthermore be omitted in the signal paths with the duplexers D1 and D5 to D7.

Figure 13:
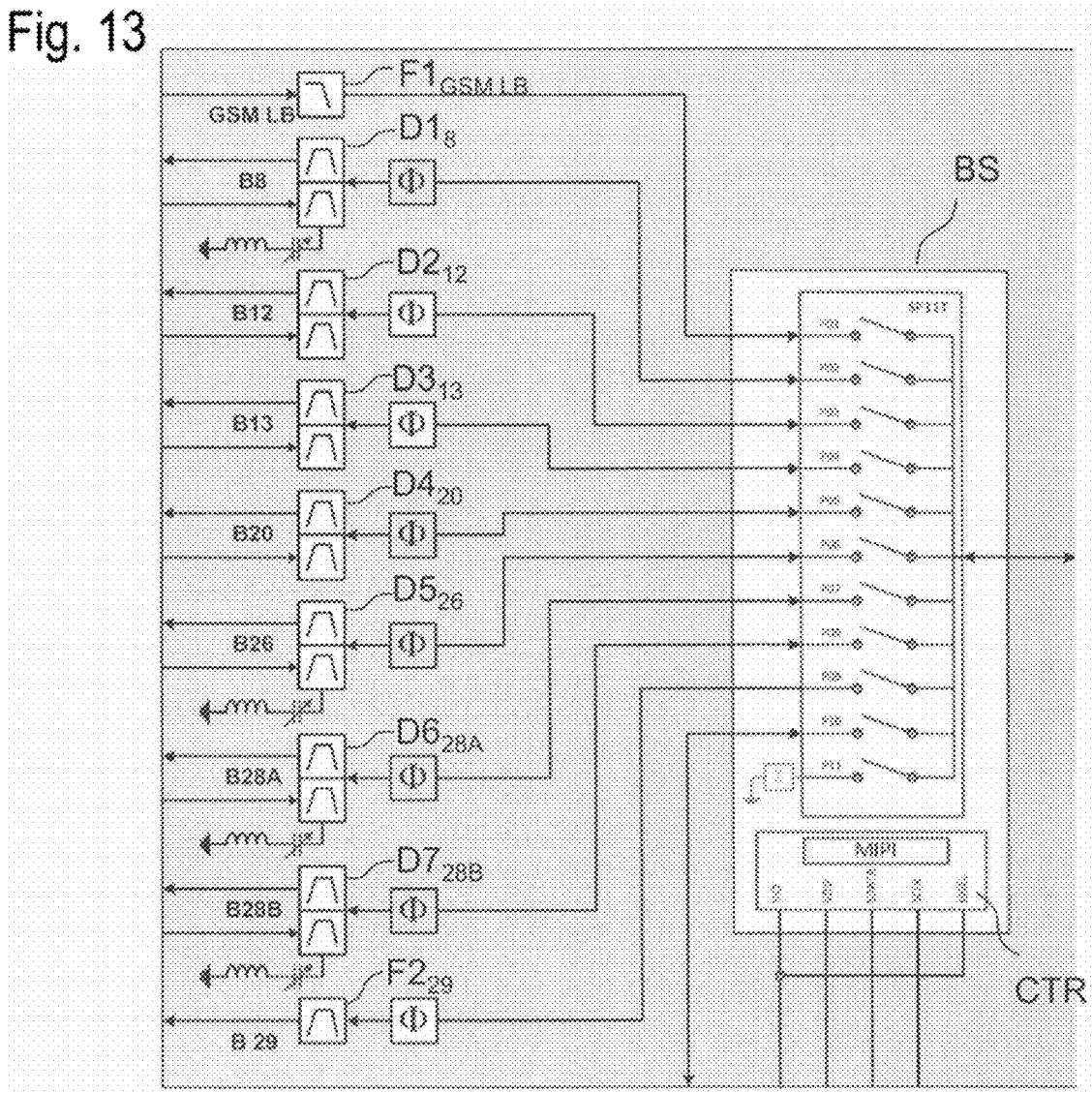

FIG. 13 shows an embodiment of a band switch BS, which can connect an antenna connector to a plurality of signal paths, wherein individual signal paths or, in multiplex or CA mode, several signal paths can be selected simultaneously. In the signal paths, phase shifters PS and filters F or duplexers D are respectively optionally arranged. From the top to the bottom, the example shown in FIG. 13 comprises signal paths for the following filter elements:

Rx filter F1 for GSM low band (LB)
Duplexer D1 for band 8
Duplexer D2 for band 12
Duplexer D3 for band 13
Duplexer D4 for band 20
Duplexer D5 for band 26
Duplexer D6 for band 28A
Duplexer D7 for band 28B
TX filter F2 for band 29

With this arrangement, the following bands can respectively be combined with band 26 (also includes band 5 at the same time) in CA mode: band 12, band 13, band 28A, band 28B, and band 29.

With band 8, the following bands can be combined in CA mode: band 20, band 28A, and band 28B.

The control of the band switch BS takes place via a control unit, which is designed, for example, as a MIPI controller.

Figure 14:
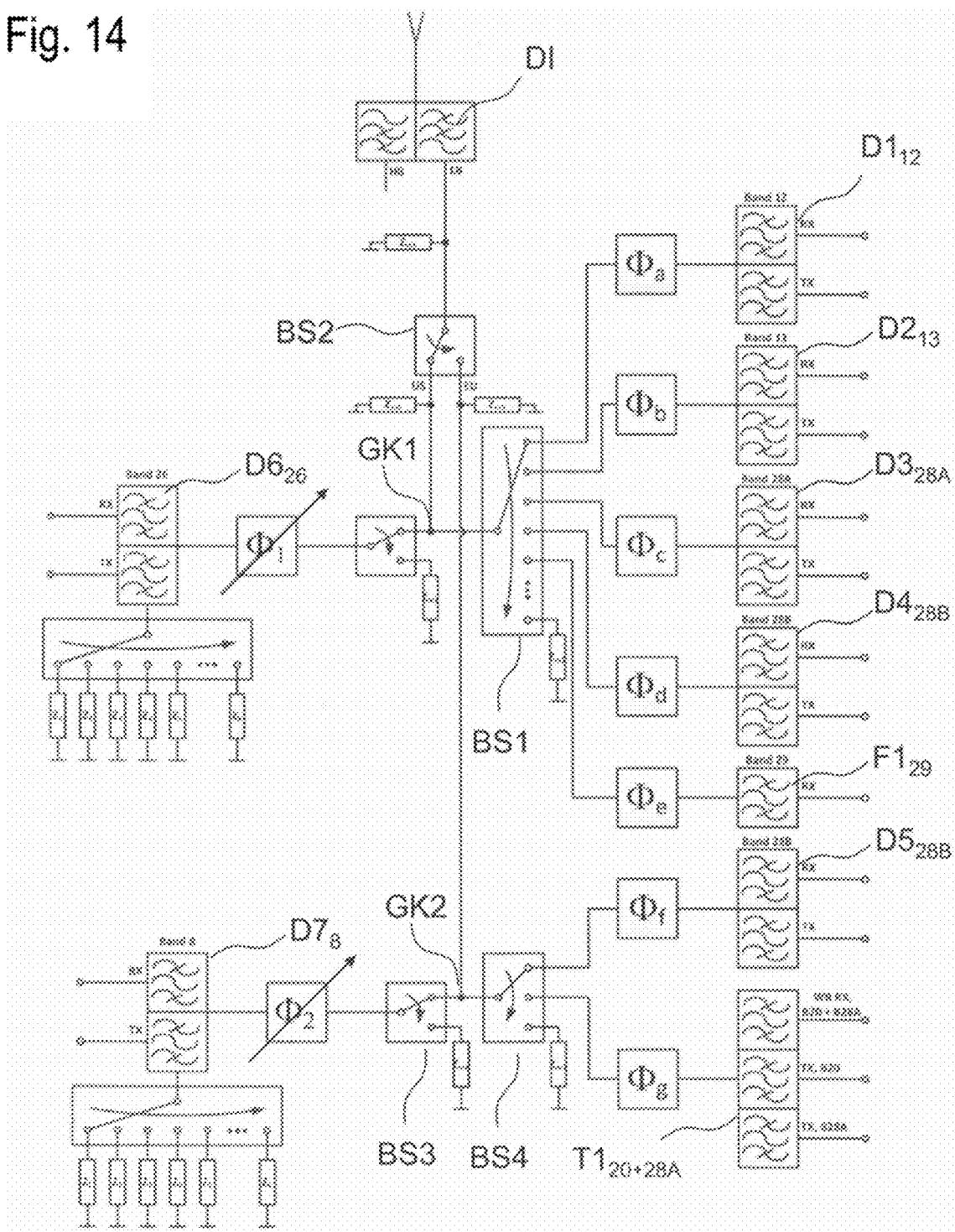

FIG. 14 shows an arrangement, which can cover the low-band range for the regions US, JP, and Europe. The arrangement comprises a partial structure, which corresponds to FIG. 1. However, between the diplexer DI on the antenna side and the first common node GK1, another band switch BS2 is additionally inserted, the first switch position of which specifically unlocks the arrangement of FIG. 1. Via the second switch position of BS2, the LB output of the diplexer DI is connected to a second common node GK2. Connected to GK is a third band switch BS3, which can unlock a signal path for band 8, in which signal path a duplexer $D7_8$ and a phase shifter are arranged. The Tx filter of D7 is connected to a switch S, which can connect individual impedance elements or combinations of impedance elements in order to produce a notch.

Furthermore, connected to a second common node GK2 is a fourth band switch BS4, which can select between a signal path for band 28B, including phase shifter and duplexer $D5_{283}$, and a signal path with a triplexer T1. The triplexer T1 comprises a broadband Rx filter for the RX frequencies of bands B20 and B28A, a Tx filter for band 20, and a Tx filter for band B28A. With this multiplexer, the following band combinations are, for example, possible for CA mode:

B8 and B28A
B18(B26) and B28A
B19(B26) and B28B
B8 and B20
B20 and B28A
B5(B26) and B29
B5(B26) and B12
B5(B26) and B13

Figure 15:
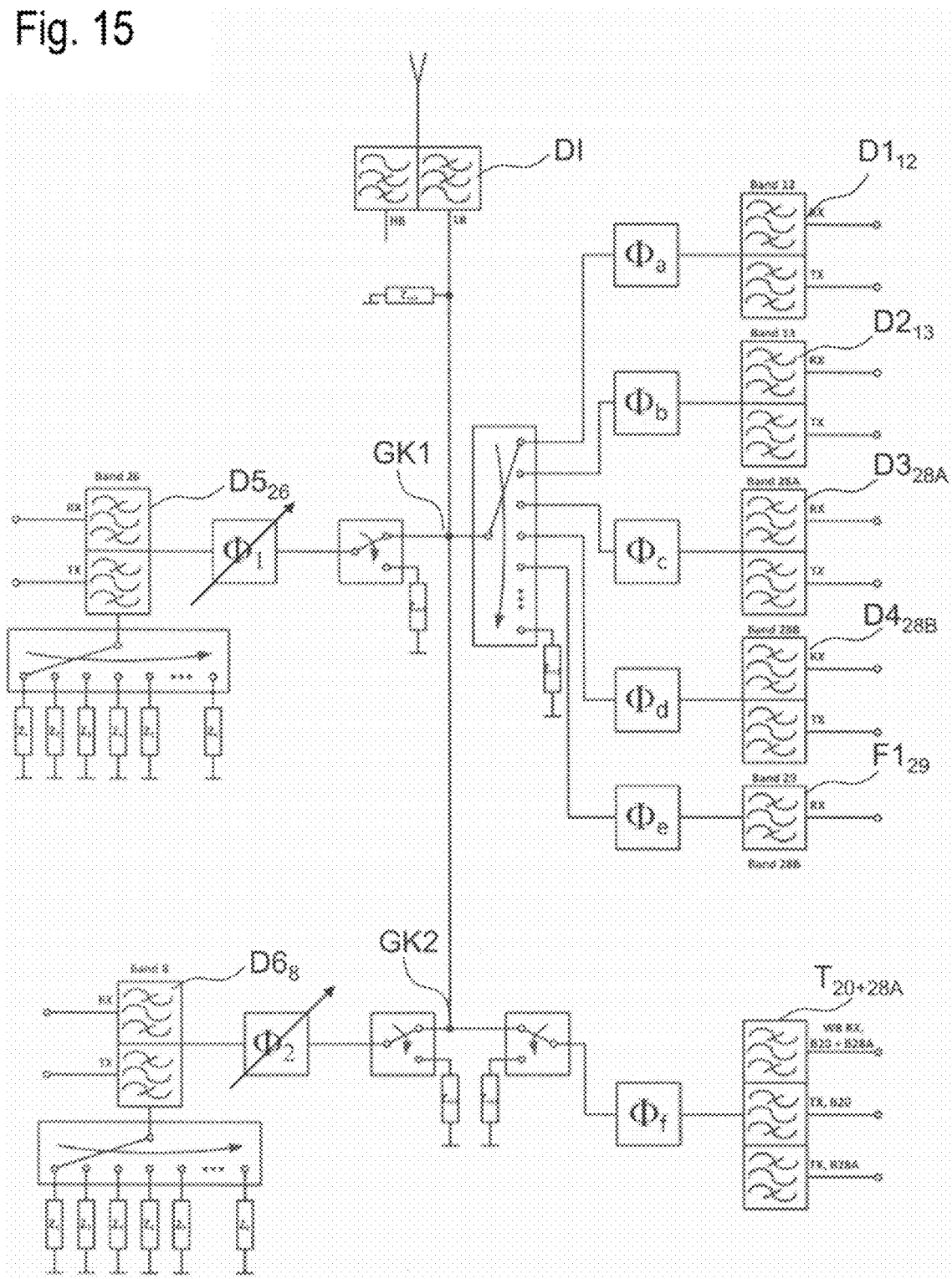

The arrangement of FIG. 15 shows a multiplexer, which constitutes a modification of the multiplexer of FIG. 14. While according to FIG. 14, a first band switch can select between the partial circuit of FIG. 1 and an additional partial circuit at the second common node, the first and second common node GK, GK2 are connected directly to each other in FIG. 15. The additional partial circuit at the second common node or the additional signal paths connected thereto are designed as described in FIG. 14. This multiplexer also allows for the band combinations specified above for FIG. 14.

Figure 6A:
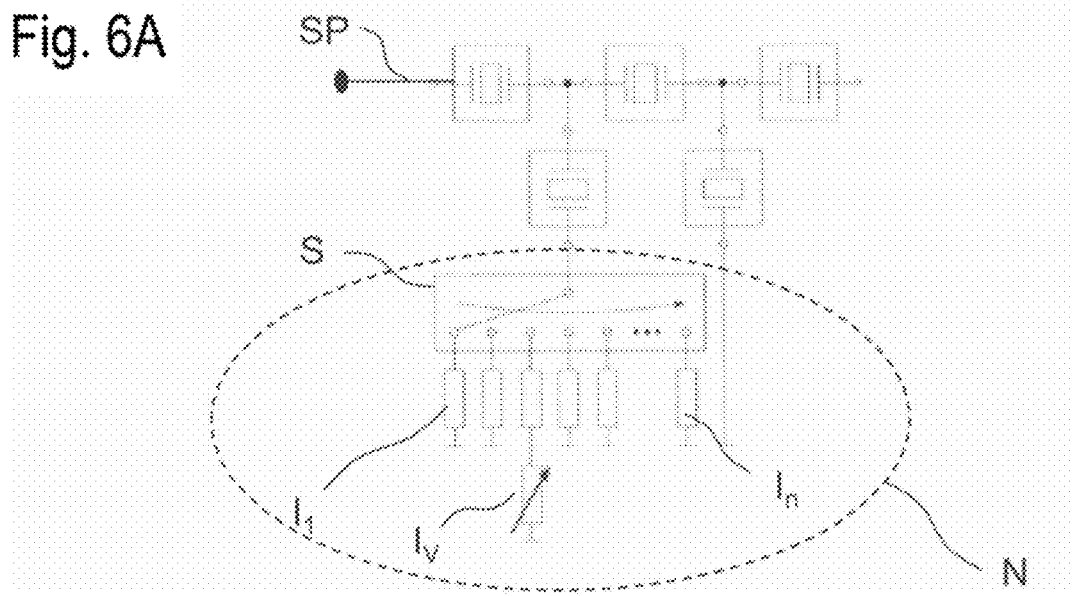
FIG. 6b shows a similar arrangement as FIG. 6a, in which the impedance is however designed to be adjustable.
FIG. 6c shows a variant of FIG. 6b and comprises a parallel circuit of an adjustable capacitor $C_V$ and an inductance.

Alternatively (not shown), the switches S and the impedances connectable thereby on the duplexer $D5_{28}$ and on the duplexer $D6_{28}$ can respectively be replaced in a variant of FIG. 15 by an adjustable impedance as illustrated in FIGS. 6B, 7B, and 7C. Likewise, the phase shifters can also again be adjustable or switchable.

In another variant (not shown), other signal paths are alternatively connected to the second common node GK2 and respectively selectable by means of a band switch. These are a signal path for band B8 comprising a phase shifter and a duplexer as well as a signal path for band B20 comprising a phase shifter and a duplexer. The duplexer for band B8 can again be connected to a notch, which comprises switchable impedances or an adjustable impedance.

Since the invention could only be expressly explained with reference to a few exemplary embodiments, it is not limited to these embodiments. The fact alone that the multiplexer can be reconfigured in an almost unlimited manner allows for combining a plurality of signal paths via appropriate band switches and phase shifters. Each TX filter can be improved in its transmission behavior by means of a notch by being able to generate at a desired frequency an additional pole with subsequently improved insulation in the opposite band. A multiplexer according to the invention is however already obtained without this notch, which only improves the insulation and is not required for the multiplexing per se. The multiplexer allows for carrier aggregation for both Rx mode and Tx mode. In principle, the notch concept can also be applied analogously to Rx filters.

The following table 2 specifies the frequency positions of bands 5, 7, 12, 13, 17, 25, 29, 30, 38, and 40. According to the 3GPP standard 3GPP TS36.101 V13.3.0 (2016-03), two-band carrier aggregation combinations of band 5 with one each of the other remaining bands are provided:

TABLE 2

| Band | Tx (MHz) | | Rx (MHz) | | |
|---|---|---|---|---|---|
| 5 | 824 | 849 | 869 | 894 | FDD |
| 7 | 2500 | 2570 | 2620 | 2690 | FDD |
| 12 | 699 | 716 | 729 | 746 | FDD |
| 13 | 777 | 787 | 746 | 756 | FDD |
| 17 | 704 | 716 | 734 | 746 | FDD |
| 25 | 1850 | 1915 | 1930 | 1995 | FDD |
| 29 | N/A | | 717 | 728 | FDD |
| 30 | 2305 | 2315 | 2350 | 2360 | FDD |
| 38 | 2570 | 2620 | 2570 | 2620 | TDD |
| 40 | 2300 | 2400 | 2300 | 2400 | TDD |

All of these CA pairings can be realized with a multiplexer according to the invention.

CA band combinations of 3, 4, or 5 bands are also possible with the proposed multiplexer.

Examples for three band CA combinations are, for example, 2-5-12, 2-5-13, 2-5-29, and 1-5-7.

Examples for four band CA combinations are, for example, 2-2-5-7, 4-4-5-30, 4-4-5-12, 2-4-5-29, and 2-4-5-30.

Five band CA combinations have not been defined so far but are also conceivable.

LIST OF TERMS AND REFERENCES

A Antenna connector
B3, B5 . . . Frequency bands
BS Band switch
$C_V$ Adjustable capacity
CTR Control unit
D Duplexer
DI Diplexer
F Filter
GK,GK1,GK2 Common node
I Impedance
IE Impedance element
$I_T$ Terminating impedance at a BS
$I_V$ Adjustable impedance
N Notch, notch filter
PS Phase shifter
S Switch
SP Signal path
TF Partial filter
  Bypass
  CA band combination
  Frequency band
L Inductance
  Multiplexer
  Parallel branches, therein
  Series branch
  Single pole switch
  Partial Tx filter
  Interrupter switch

The invention claimed is:
1. A multiplexer comprising:
a plurality of filters and/or duplexers, each respectively associated with a frequency band;

a band switch capable of connecting an antenna connector to two or more of the filters and/or duplexers at the same time;

one or more phase shifters capable of adjusting a suitable phasing of at least one of the plurality of filters or duplexers during a multiplex mode, wherein a phase shifter is arranged between the band switch and each of the one or more filters or duplexers; and at least one notch adapted to be connected to one of the filters or a partial filter of a duplexer to improve the interband insulation in the multiplex mode.

2. The multiplexer according to claim 1,
in which the filter, to which the at least one notch is adapted to be connected, is a Tx filter or a partial Tx filter, wherein the filter is designed in a ladder-type technology and comprises a series branch as well as several parallel branches with impedance elements, and wherein the notch comprises an impedance with a given value, which impedance can be switchably connected to a parallel branch of the Tx filter or of the partial filter, and/or in which the notch comprises an adjustable impedance.

3. The multiplexer according to claim 2,
in which the impedance of the notch comprises an inductance.

4. The multiplexer according to claim 2,
wherein the Tx filter or the partial Tx filter is designed in ladder-type technology and comprises a series branch as well as several parallel branches with impedance elements, and wherein one of the parallel branches is connected to a switch, in which individual or in parallel several impedances can be connected to the parallel branch of the Tx filter or of the partial Tx filter via the switch.

5. The multiplexer according to claim 2,
wherein the Tx filter or the partial Tx filter is designed in ladder-type technology and comprises a series branch as well as several parallel branches connected to ground with impedance elements, and wherein an adjustable impedance is connected in one of the parallel branches in series to the impedance element.

6. The multiplexer according to claim 2,
in which the notch is a notch filter that is connected in series between the band switch and the Tx filter or the partial Tx filter, wherein the notch filter can be bridged by a bypass, wherein the bypass can be connected or disconnected by means of an interrupter switch.

7. The multiplexer according to claim 2,
wherein a phase shifter is connected between a filter or duplexer and the band switch and optionally between each filter or duplexer and the band switch, at least one of which phase shifters is a fixed phase shifter that produces a predetermined phase shift, and wherein at least one other phase shifter is a variable phase shifter, by means of which various phase shifts can be adjusted.

8. The multiplexer according to claim 1,
further comprising one of a diplexer, triplexer, or higher order multiplexer, connected upstream of the band switch and separates a low-band range from a frequency range located above it.

9. The multiplexer according to claim 2,
in which the band switch comprises single-pole switches, which can respectively connect one filter or one duplexer to either the antenna connector or a permanent termination, in which each filter or each duplexer is connectable to the antenna connector via an optional phase shifter and a single-pole switch.

10. The multiplexer according to claim 2,
in which the multiplexer is designed for Carrier Aggregation "CA" band combinations, which includes the combination of a first duplexer with a second duplexer selected from a plurality of additional duplexers, wherein one or more of the phase shifters are at least one of adjustable, switched, or reconfigurable, and wherein the notch is designed to be at least one of adjustable, switchable, or reconfigurable for several or all Tx filters or partial Tx filters provided for the CA combinations.

* * * * *